May 15, 1951 M. WEIL 2,553,492

MAGNETIC PICKUP HAVING MULTISTYLI

Filed May 25, 1949 2 Sheets-Sheet 1

INVENTOR
Maximilian Weil
BY
Dean Fairbank & Hirsch
ATTORNEYS

MAGNETIC PICKUP HAVING MULTISTYLI

Filed May 25, 1949 2 Sheets-Sheet 2

INVENTOR
*Maximilian Weil*
BY
*Dean Fairbank & Hirsch*
ATTORNEYS

Patented May 15, 1951 2,553,492

UNITED STATES PATENT OFFICE 2,553,492

MAGNETIC PICKUP HAVING MULTISTYLI

Maximilian Weil, Scarsdale, N. Y.

Application May 25, 1949, Serial No. 95,233

19 Claims. (Cl. 179—100.41)

Figures 1, 2, 3, 11, 12:
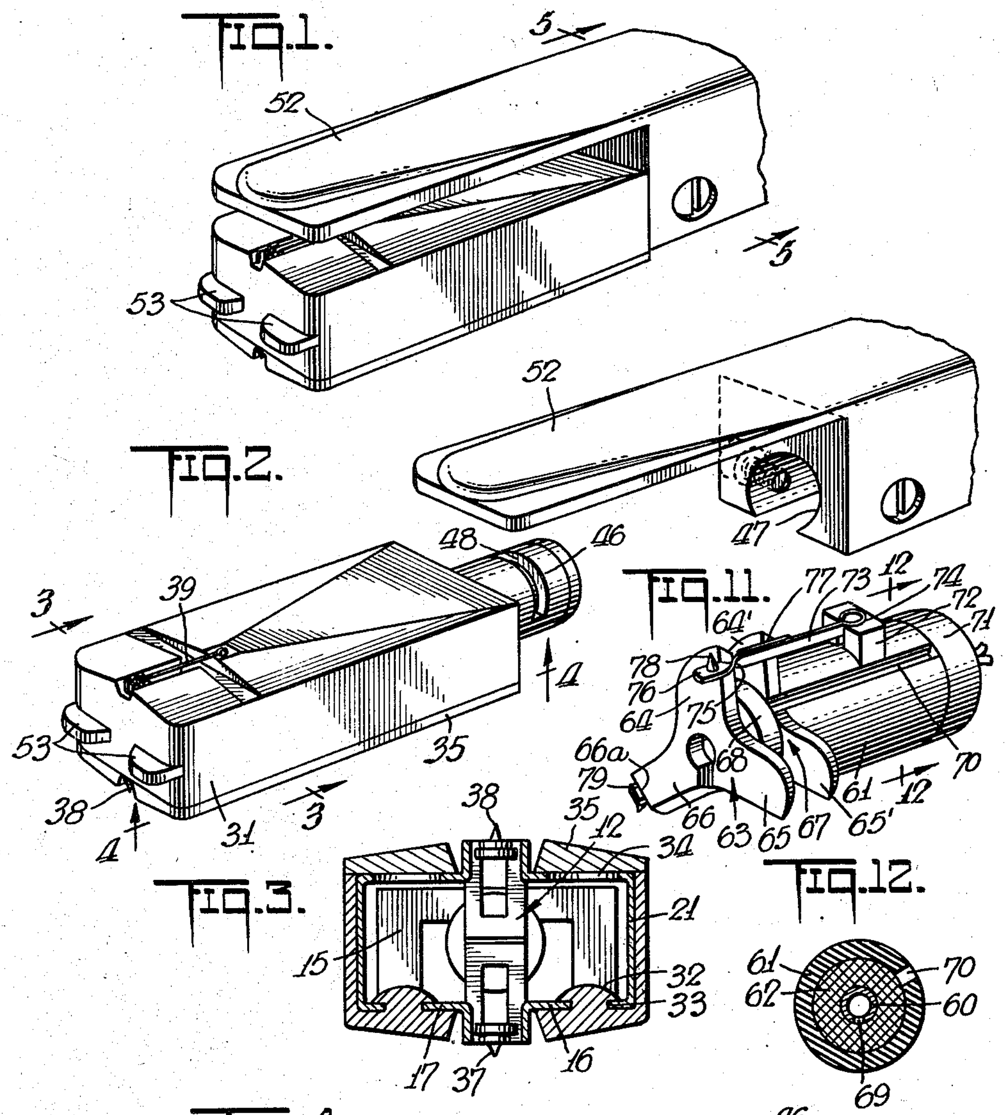

The present invention is concerned with systems for translating recorded sound waves into electrical impulses and is more particularly concerned with magnetic pick-ups for phonographs.

As conducive to a clear understanding of the underlying purpose of the invention, it is noted that each of various types of phonograph records requires a distinct design of stylus for satisfactory operation. Inasmuch as radio broadcasting stations as well as the typical phonograph owners will have a collection of various types of records, including the conventional vertically cut, and the conventional laterally cut discs, the necessity for changing to a different reproducer or stylus as different types of records are to be played is an annoyance. The recently introduced micro-groove or long playing record has accentuated the need for a reproducer or pick-up capable of accommodating all types of records.

It is accordingly one of the objects of the invention to provide a magnetic pick-up for phonograph records which shall have the versality to accommodate records of two or more different types, such for instance as the conventional laterally cut record, the laterally cut micro-groove record and the conventional vertically cut record, and which pick-up does not require the constant change of reproducer or stylus as different types of discs are to be played, but incorporates each of the various styli in its construction and admits of playing each record with the selected stylus by merely setting the reproducer structure in appropriate position for the selected stylus to be in service.

Another object is to provide a structure of the above type in which the operation of any stylus is in nowise impaired or impeded as by interaction or phase distortion due to the presence of the other styli and the magnetic circuits associated therewith.

Another object is to provide a magnetic pick-up of the above type which is relatively simple and inexpensive in construction, which has no delicate parts that require adjustment and which avoids duplication of many elements for the duplex or multiple purposes which it serves and so has relatively low weight and therefore avoids undue wear of the record groove.

According to one feature of the invention, the magnetic field structure affords a plurality of air gaps arranged in parallel in the magnetic circuit, each air gap being between a corresponding pair of pole conformations. Associated with the air gap between each set of associated pole conformations of the magnetic field structure is a tiny magnetic alloy armature or flux relay element which serves as a flux modulator mechanically affixed with respect to the corresponding stylus. Accordingly the same fixed magnetic field structure will serve to energize the voice coil from any selected stylus without interaction, distortion or inter-modulation.

According to another feature, the pairs of pole conformations are arranged at intervals about the forward end of the magnetic field structure, one on an outer or encompassing element of the magnetic field structure and the other on an inner element that may be and preferably is the core which extends through the voice coil, the pairs of poles defining gaps longitudinally of and near the free end of the pick-up.

Each stylus with its associated armature or flux relay element or flux modulator is desirably rigidly mounted upon a carrying lever or bar of non-magnetic spring metal removably mounted at its root end to the structure preferably to the case of the unit.

For use with the laterally cut sound record, the armature or flux relay element or flux modulator extends and moves laterally with respect to the pole conformations that determine the associated air gap of the magnetic field structure, while for vertically cut records the armature or flux relay element moves inward and outward toward and away from such air gap.

According to another feature, the various styli protrude laterally from one end of the unit, which unit is rotatably mounted at its other end upon the tone arm so that it may readily be turned about its axis to place any selected stylus into operation.

Figure 4:
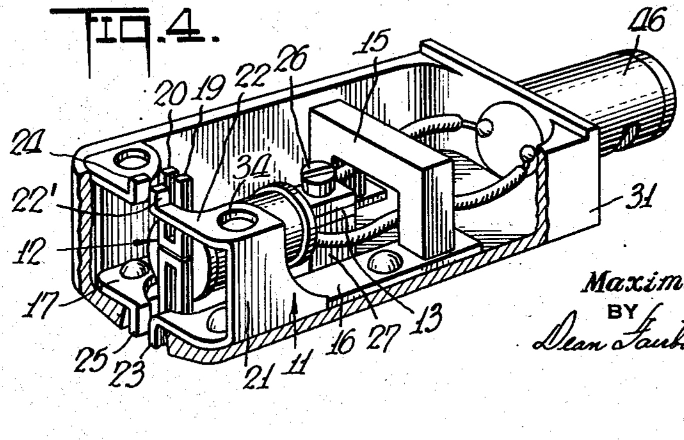
Figure 5:
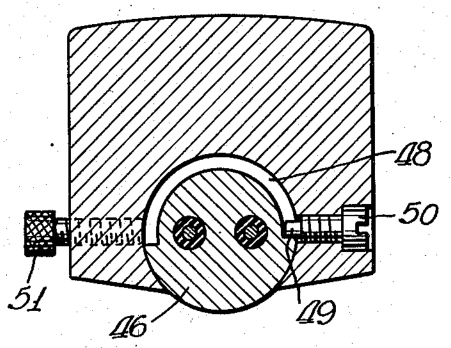
Figure 6:
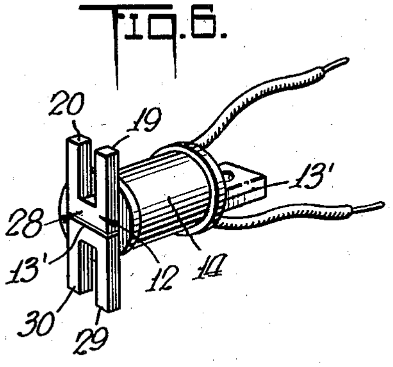
Figure 7:
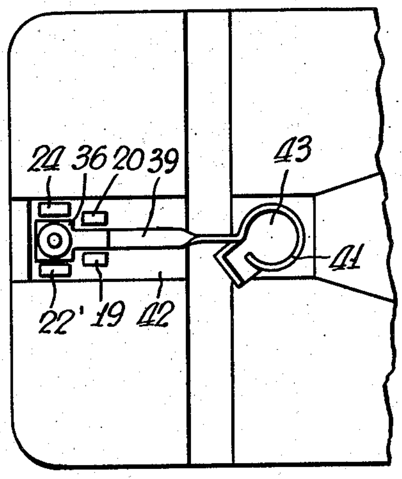
Figure 8:
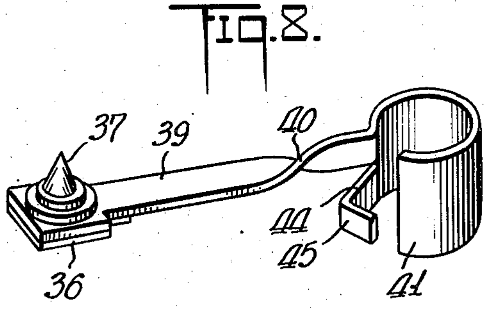
Figure 10:
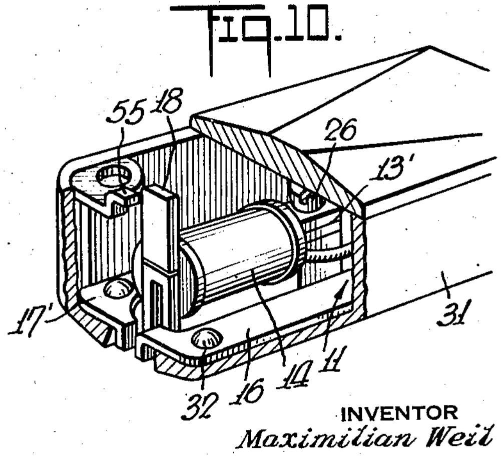
Figure 9:
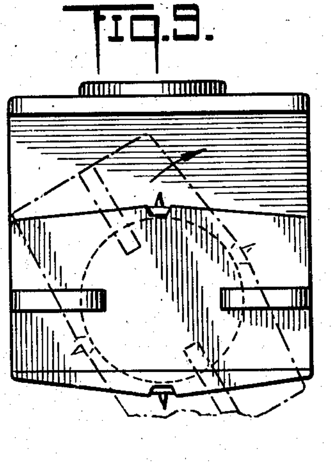

In the accompanying drawings in which are shown one or more possible embodiments of the invention, Fig. 1 is a perspective view showing one embodiment of the magnetic pick-up as mounted on the tone arm, Fig. 2 is a perspective view showing the pick-up disassembled from the tone arm, Fig. 3 is a transverse sectional view taken on line 3—3 of Fig. 2, Fig. 4 is a perspective view with parts removed and broken away of the magnetic pick-up, Fig. 5 is a view in transverse cross section, taken on line 5—5 of Fig. 1, Fig. 6 is a perspective view of the voice coil element, Fig. 7 is a plan view on an enlarged scale of a fragment of the face of the pick-up structure, Fig. 8 is a perspective view on an enlarged scale of the stylus mount system, Fig. 9 is a forward end elevation of the tone arm and associated magnetic pick-up showing the adjustment operation, Fig. 10 is a view generally similar to Fig. 4, of a modification, Fig. 11 is a perspective view of another embodiment of the invention, and Fig. 12 is a transverse sectional view on line 12—12 of Fig. 11.

Referring now to the accompanying drawings, the system for translating recorded sound waves is shown embodied in a magnetic pick-up unit which illustratively comprises a magnetic field structure including a source of magnetic flux, such as the permanent horseshoe magnet 15, having magnetically coupled therewith the pole shoes including an outer element 11 and an inner element or core 12 which extends through voice coil 14.

As illustratively shown, the magnetic field structure includes an upstanding horseshoe magnet 15, the poles of which are rigid with pole shoe bars 16 and 17, the outer extremities of which are conformed as a pole head with a multiplicity of pole conformations desirably uniformly spaced along the outer end of the structure.

While the pole head might have any number of such poles within the physical limits of the construction, there is illustratively shown in Fig. 4 and arrangement in which two of such pole conformations illustratively both for laterally cut records are provided. To this end as shown, each pole shoe 16, 17 is a bar conformed as a channel at the pole end thereof, which channel includes an upstanding wall 21 and an inturned ledge 22, the extremities of the ledges 22 and the corresponding side of the underlying bar 16, 17 having each an out turned tongue 22′, 24 and 23, 25, respectively, each of which constitutes a pole element, the tongues 24 and 25 being spaced from tongues 22′ and 23 respectively to form a split pole element 22′, 24 at one face and a similar element 23, 25 at the other face.

Desirably the core element 12 is affixed by screw 26 at its inner extremity to a non-magnetic lug 27 rising from the floor of the unit and the outer end of said core carries a head 28 (Fig. 6) with as many radiating arms as there are pole conformations on the pole head of magnetic field structure 11. The arms have pole conformations which would be a single pole such as 18 in Fig. 10 for vertically cut records and would be split as at 19, 20 in Fig. 4 for laterally cut records, and the pole conformations of the two magnetic elements, viz., elements 11 and 12, are in registry to afford the desired air gap therebetween.

In the illustrative embodiment shown in Fig. 4 the pole shoe of the core element 12 is a transverse bar bifurcated at each end to determine one split pole 19, 20 and a diametrically opposed split pole 29 and 30.

As shown in Fig. 4, the split pole 19, 20 of the core element 12 is adjacent to, but spaced by an air gap from the split pole 22′, 24 of the magnet field structure element 11 and the same relation exists between the poles that are diametrically opposed to those just described.

The core element 2 may desirably be made of two generally angle shaped pieces 13 welded together face to face at 13′ with their shorter legs diverging or radiating outward to form the poles.

While the fixed magnetic structure described, composed of the magnet field element 11 and the fixed core element 12 with the respective pole heads or pole conformations thereof may be mounted in any of various possible ways for correlation with the vibratory elements to be hereinafter described, the drawing illustratively shows a housing or case 31 to which the pole shoes 16, 17 of the field structure may be affixed as by upsetting as at 32 an upstanding stud of the case through holes 33 in the pole shoes. To this end corresponding holes 34′ in the ledges 34 may serve for introduction of the upsetting tool. A cover 35 may likewise be affixed by any appropriate means such as rivets (not shown), to the upper rim of the case 31.

As shown in Fig. 7, in the space between the portions 19 and 20 of each pole conformation of the core element 12 and the space between the associated portions 22′ and 24 of the corresponding pole conformation of the field element 11 is a tiny magnetic alloy armature or flux relay element or modulator 36 in the form of a thin, soft magnetizable plate at and which bridges across the air gap intervening between such conformations. In the embodiment for laterally cut records, one end of the armature or flux relay strip 36 is lodged in the space between pole conformations 22′, 24 of the field structure 11 and near the other end thereof in the space between the associated pole conformations 19, 20 of the core element 12. Rigid with the armature or flux relay strip 36 is the stylus 37 which protrudes outward from the unit or the case thereof. In the particular embodiment shown, stylus 37 protrudes downward from the case and stylus 38 upward from the cover 35.

While any suitable system might be employed for mounting the stylus and its associated armature or flux relay element to respond to the movement impressed thereon by the sound record, it is preferred to affix these elements to a spring metal stylus lever or bar 39 removably mounted on the body of the unit. In a preferred embodiment shown, that bar is a cantilever of highly tempered non-magnetic spring material such as beryllium copper. Preferably the lever 39, the main length of which extends in a horizontal plane parallel with the armature or flux relay strip 36, is twisted at right angles as at 40 adjacent the cylindrical mount 41 thereof formed integral with the root end of the bar.

Each stylus system is accommodated in a groove 42 longitudinally of the case as shown, each stylus system having its own independent mount, and the cylindrical mount is disposed in a corresponding cylindrical bore 43 in the case and has a unitary tongue 44 near the lower edge of said cylinder, said arm having an inturned toe 45 that precludes rotary movement of the mount in either direction.

It will be understood that one of the stylus lever assemblies, such as shown in Fig. 8, is associated with the air gap between corresponding pole conformations 19, 20, 22′, 24 and 29, 30, 23, 25 of the magnetic elements 11 and 12 of the magnetic circuit.

Desirably the magnetic pick-up unit has a plug and socket mount at its inner or root end with respect to the tone arm and said mount is so constructed as to admit of positioning the unit selectively for placing any one of the plurality of styli in operative engagement with the record to be played. In the embodiments specifically shown, the root end of the pick-up unit has a plug 46 fitting into a corresponding socket 47 of the tone arm and adjustable by turning in said socket for selection of the stylus to be used. As applied to the two-stylus embodiment illustratively shown, the plug has a semi-circular groove 48 in which rides the tip end 49 of a screw 50 in the tone arm, the two ends of the semi-circular track determining respectively the setting shown in Fig. 3 in which stylus 37 is lowermost, and Fig. 2 in which stylus 38 is lowermost. Preferably a set screw 51 locks the plug 46 in any set position.

The tone arm is desirably made with a forwardly protruding ledge 52 extending over the length of the pick-up unit for protection thereof but spaced therefrom sufficiently to permit the rotary movement thereof for setting desirably by pushing against grip fingers 53 protruding from the forward end of the case 31.

In operation, with a laterally cut record as lateral vibration is impressed upon the stylus, its associated armature or flux relay element 36 moves therewith as best shown in Fig. 7, in the air gap between the pole conformation 22, 24 of the magnetic field structure element 11 and the pole conformation 19, 20 of the core element 12. As the armature or flux relay strip 36 approaches pole portion 22, a magnetic flux passes therefrom through the length of said armature or flux relay element 36, thence through pole portion 19 and the magnetic core 13 to the opposite pole of magnet 15.

When the armature or flux relay strip 36 now swings under vibration of the stylus in the opposite direction to approach pole portion 24, the circuit is in reverse direction from magnet 15, through core 13, core pole 20 and through the length of the armature or flux relay strip 36, thence by way of pole portion 24 through pole shoe 17 to the opposite pole of magnet 15. The reversal of magnetic flux through the core induces an E. M. F. into the voice coil in manner readily understood.

As will be readily seen, the pole conformations associated with the various armature or magnetic flux relay element of the unit are arranged in parallel and not in series so that regardless how many styli and associated armature or flux relay elements are employed on the unit, there will and can be no interaction or distortion as, for instance, by inter-modulation even though for each stylus one and the same fixed magnetic circuit is used. In fact it is only the small pole elements of said circuit and the armature or magnetic flux relay elements that are individual to each of the several styli and these, as above noted, are arranged in parallel.

The arrangement set forth thus promotes simplicity and lightness of construction and affords facsimile reproduction.

While the individual stylus systems could be identical to admit of convenience in shifting styli for playing records of one and the same type, the invention has its most important field of application, as above suggested, to a more or less universal magnetic pick-up adaptable to any and all of various types of sound records including laterally and vertically cut sound records and micro-groove or long playing records, whether of either or both the laterally cut or vertically cut type, as well as other types of records, if any there be. The stylus lever assembly need merely be designed for the particular type of record for which it is intended and the unit may be made with as many of the distinct types of stylus and mounts therefor as is desired.

The embodiment of Figs. 1 to 4 for instance, which shows a two-stylus system, both for laterally cut records, might utilize one stylus 37 for ordinary laterally cut records and a more slender stylus 38 might be carried by the other stylus lever, to be suitable for the long playing or micro-groove laterally cut record.

In the alternative embodiment shown in Fig. 10, the pole system near the bottom of the figure is identical with that of Fig. 4, but that shown at the top of the figure is designed for a vertically cut record in that the pole conformation 55 at the top of the magnet bar 17′ has a single rather than a split pole, as has also the corresponding end 18 of the cross bar on the fixed core element 13′. The armature or magnetic flux relay strip (not shown) would of course bridge across and above the air gap between poles 55 and 18 and the stylus lever 39 would flex up and down in operation.

In Figs. 11 and 12 is shown an embodiment of the invention to accommodate three styli. The magnetic field structure comprises a source of magnetic flux 71, an inner pole shoe or core element 60 and an outer pole shoe element 61, all magnetically coupled together. The voice coil 62 surrounds the core element 60 and is in turn within the outer element 61. The core element 60 has a pole head 63, preferably integral therewith, shown with three outwardly radiating poles 64, 65 and 66. The outer element 61 has a similar pole head 67 also preferably integral therewith, whose three poles, two of which are shown at 64′ and 65′ match those of the core and are in registry therewith, but spaced therefrom, preferably by the thickness of the flange 68 of the voice coil spool which is interposed between said heads.

Desirably the core element 60 is tubular and the outer element 61 is likewise tubular, that is, in the form of a cylindrical shell as shown. To avoid eddy currents, the core tube 60 is preferably longitudinally split as at 69 and the shell is likewise longitudinally split as at 70.

While the magnetic connection between the core 60 and the outer element 61 of the field structure may be of any of various constructions, a permanent magnet plate or disc 71 which is magnetized radially with one pole at the center and the opposed pole at the periphery is desirably disposed against and superposed over the rear ends of said pole shoe elements 60, 61. By virtue of its permanet magnetism, the disc 71 remains in secure engagement with the two elements 60 and 61 which in turn remain assembled by virtue of their fairly tight fit with respect to the voice coil 62.

The magnetic field structure is preferably of high quality magnetic alloy, and the outer tube or shell 61 thereof affords excellent shielding, since it entirely encloses the voice coil.

Affixed to the outer field element 61 are upstanding lugs of suitable material, one for each stylus lever, but only one of which is shown at 72, in which the stylus lever 73 is mounted at 74 in manner similar to the mount shown in Fig. 7. For the laterally cut record, the stylus lever differs somewhat in construction from that shown in Fig. 8 in that the twist 75 is not near the mount end as in Fig. 8 but near the free end 76. That twist in fact is beyond or to the left of the pole head 63 of the core 60. A second difference is that the armature or magnetic flux relay plate 77, unlike that shown in Fig. 8, is mounted beyond or to the right of the twisted portion 75 and at a distance from the stylus 78. That plate 77 extends for the upstanding width of the stylus lever 73 and is of length to extend across the thicknesses of each of the pole heads 64 and 67 and to straddle the air gap therebetween, as shown.

It will immediately be apparent that in use of the magnetic pick-up shown, the stylus 78 when following a laterally cut record, will move the armature or flux relay plate 77 toward and away from the poles 64 and 64' and thereby modulate the magnetic flux through the field, with induction of an E. M. F. in the voice coil 62 in manner readily understood.

The poles 65 and 65' are shown similar in shape to poles 64 and 64' and suitable also for laterally cut records and may have a stylus (not shown) for the micro-groove type of record, where stylus 78 is say for the conventional type of laterally cut record.

Pole 66 and its companion (not shown) are of somewhat different shape, each with a squared end 66ª. Such shape of poles serves for the vertically cut record, in which the armature or flux relay plate (not shown) would extend in the same plane as the outer end 79 of the corresponding stylus lever. To that end, the twist of the stylus lever 79 would of course not be near the outer end as at 75 but beyond or to the right of the pole head 67. In other words it would be substantially in the location shown at 49 in Fig. 8. As is obvious, the armature or flux relay plate for the vertically cut record would move radially inward and outward with the vertical movement of the stylus toward and away from the square ended pole 66ª and its companion (not shown), the air gap between which poles is straddled by the armature or flux relay plate.

While the embodiment of Figs. 11 and 12 is shown with three poles, it is of course obvious that it could be incorporated in a magnetic pick-up with but two poles or with four or more poles and corresponding number of stylus levers and styli.

The mount of the embodiment of Figs. 11 and 12 might be similar to that of the other embodiments, modified of course to accommodate the greater number of settings.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A duplex magnetic pick-up for alternative use for each of two types of sound records that require different styli, said pick-up comprising a magnetic field structure, including an outer element and a core element, a voice coil about the latter and within the former; said outer element and said core element each having two pairs of opposed poles, the respective pairs of the outer and of the core elements being near but spaced from each other to form a gap, a pair of styli, each stylus having a lever mounted in fixed relation with respect to the magnetic field structure, each stylus having a separate and distinct armature rigid therewith, each of said armatures being mounted in the magnetic field of the corresponding air gap between the pole pairs of both the outer and the core structure elements, and means displaceably mounting said pick-up to permit positioning the same alternatively, face up or face down, depending upon the stylus selected for use.

2. A duplex magnetic pick-up for playing alternatively conventional and micro-groove records, said pick-up including a magnetic field structure comprising an outer portion and a core portion, a voice coil about the latter, said outer portion having two pairs of poles arranged in parallel said core portion having a double-yoke pole head at one end thereof with the arms of said pole head extending, respectively, near but spaced from the respective pairs of poles of said outer portion, a pair of separate and distinct stylus carrying levers pivotally mounted with respect to the magnetic field structure, each having a stylus near the free end thereof, said styli being differentiated, one for playing conventional records and the other for playing micro-groove records, each stylus having a separate and distinct armature rigid therewith, each of said armatures being magnetically insulated with respect to the corresponding stylus mount and bridging the gap between the poles and the corresponding yoke pole head of the magnetic core.

3. A magnetic pick-up to serve alternatively for playing laterally cut or vertically cut phonograph records, said pick-up comprising a magnetic field structure consisting of a source of magnetic flux, an outer shoe portion and a core pole shoe portion, said core portion having a pole head transversely across the free end thereof and bifurcated at one end thereof, said outer portion having a pair of spaced pole portions near but spaced from said bifurcated pole and presenting an air gap with respect to said bifurcated pole end, said structure also presenting a single pole shoe having an air gap with respect to the other end of the pole head of said core portion, a stylus having a mounting lever pivoted with respect to the field structure and having an associated armature substantially in the space between the pole portion of the outer portion and bridging between said pole portions and the associated bifurcated end of the pole head of the core portion, and a second stylus having a mount for accommodating the movements impressed by a vertically cut record, said latter stylus having an armature across the gap between the single pole of the outer portion and the associated end of the pole head of the core portion, said magnetic pick-up having mounting facilities to permit use thereof with either of the two opposed styli resting upon the record to be played.

4. A magnetic pick-up comprising a case having a mounting end and a free end, said case having a magnetic field structure comprising an outer portion and a core portion with poles on the respective field structure portions spaced from each other to present air gaps therebetween in parallel near the free end of said case, said pick-up having styli each having rigid therewith, a separate and distinct armature, each of said armatures being in the magnetic field of the corresponding air gap, each stylus protruding outward from the pick-up, a fixed mounting structure for the pick-up, said mounting structure being a socket and said pick-up having a complementary plug displaceable with respect to said socket, to permit mounting the pick-up in position for one of the styli at will to be directed for riding upon a sound record.

5. The combination recited in claim 4, in which the mounting structure for the magnetic pick-up is a tone arm, and means are provided to limit the displacement of the pick-up in said socket for the selected stylus to point downward, and in which the tone arm has a protruding ledge extending over the length of the magnetic pick-up and spaced therefrom sufficiently to permit of said rotary adjustment thereof.

6. A magnetic pick-up comprising a hollow case, a magnetic field structure therein comprising a horseshoe magnet, pole shoes protruding from said magnet and having a plurality of pairs of poles arranged in parallel at the free end thereof, another pole shoe comprising a fixed magnetic core with a voice coil thereabout, said core having a pole head at the free end thereof spaced from the previously recited respective pole pairs to present air gaps therebetween, a plurality of styli each having its individual mount upon the case for freedom of displacement of the stylus under the action of the record upon which it rides, each stylus having a separate and distinct armature rigid therewith, each of said armatures bridging the corresponding gap between the said associated pole shoe pairs and means for adjustably mounting the magnetic pick-up in position selectively to dispose any one of the styli in playing position.

7. A magnetic pick-up comprising a generally rectangular case, an outer magnetic field structure therein comprising an upstanding horseshoe magnet, a pair of pole shoes extending forward therefrom in said case, each pole shoe having a pair of opposed poles, the poles of the opposite pole shoes being spaced from each other to define air gaps therebetween respectively near the opposite faces of the case, a mount in the case near the upstanding horseshoe magnet, an inner magnetic core constituting part of the magnetic field structure, affixed upon said mount at one end thereof, a voice coil thereabout, said core having a pole head at the opposite end thereof with poles at the extremity thereof near the respective pole pairs of the outer magnetic field structure, a pair of styli each having an armature rigid therewith and in the magnetic fields of the respective air gaps between the poles of the respective outer magnetic field structure and the adjacent pole head of the magnetic core, each stylus having a mounting lever affixed to the corresponding face of the case and said lever being of highly tempered spring metal readily to flex under the vibration imposed upon the stylus, and means for mounting the magnetic pick-up with either face of its case uppermost, selectively to place either stylus in operation.

8. A magnetic pick-up comprising a magnetic field structure including a core element and an outer element connected in magnetic circuit therewith, a voice coil about said core and within said outer element, pole heads extending outward from the outer end of the core and pole heads extending outward from the outer end of the outer element, said pole heads being spaced from each other and including poles, each pole of one pole head being substantially in registry with the corresponding pole of the other, stylus levers rigidly mounted with respect to the field structure, each stylus lever having a separate and distinct armature, each armature extending across the proximate edges of the corresponding poles of the pole heads and in the magnetic field of the air gap therebetween, the stylus of each stylus lever being mounted near the free end thereof beyond the pole heads.

9. The combination recited in claim 8, in which the core and the outer element of the field structure are both tubular and are both longitudinally slotted to minimize eddy currents.

10. The combination recited in claim 8, in which the magnetic connection between the core and the outer element of the magnetic field is a permanent magnet plate against the rear ends of said two field elements.

11. The combination recited in claim 8, in which each stylus lever has an anchor mount on a non-magnetic lug affixed to the outer field element and in which the width of the stylus lever adjacent said mount extends radially of said field element and the outer part of the stylus lever beyond the pole heads extends at right angles to the mount end.

12. The combination recited in claim 8, in which each stylus lever for a laterally cut record has its width extending radially of the outer field element at the region spanning the poles and in which the edges of said poles adjacent said spanning portion extend substantially parallel to the corresponding magnetic flux relay element.

13. The combination recited in claim 8, in which any stylus lever for accommodating vertically cut records has the portion of the length thereof which spans the corresponding poles extending in its width at right angles to the corresponding radius of the outer field element and the associated poles extend parallel thereto at their free edges.

14. A magnetic pick-up comprising a magnetic field structure consisting of a source of magnetic flux, and inner and outer pole shoes magnetically coupled to said source, said pole shoes having poles arranged in pairs, the poles of each pair being on the respective inner and outer poles shoes and spaced from each other defining an air gap therebetween, a voice coil about one of said pole shoes, a plurality of styli, each stylus having its individual mount each of said mounts having affixing means at one end thereof and carrying a stylus at its free end, said mounts being free to vibrate at the stylus-carrying end thereof, each stylus having a separate and distinct armature rigid therewith, each of said armatures being disposed in the magnetic field of the corresponding air gap defined by each of said pairs of poles.

15. The combination recited in claim 14, in which the pick-up has a longitudinal axis and means for mounting said pick-up for displacement thereof at will about said axis to any of a plurality of settings for selectively placing into operation any one of the styli.

16. A magnetic pick-up comprising a case, a magnetic field structure therein, consisting of a source of magnetic flux and inner and outer pole shoes magnetically coupled to said source, a voice coil encompassing one of said pole shoes, each of said pole shoes having a plurality of poles near one and the same end of the pick-up, the poles of the inner as well as those of the outer pole shoes being beyond the end of the voice coil and said poles being arranged in pairs, the poles of each pair being spaced from each other to define an air gap therebetween, stylus levers each having its own independent mount upon the case, and associated with the respective air gaps, each of said stylus levers having a stylus near its free end and having a separate and distinct armature rigid with said stylus, each of said armatures being disposed in the magnetic field of the corresponding air gap.

17. A magnetic pick-up comprising a case, a magnetic field structure therein, consisting of an outer portion and a core portion, a plurality of poles at the outer extremity of the outer portion and a corresponding plurality of poles at the outer extremity of the core portion, the poles being arranged in pairs, those on the outer portion being substantially aligned with the respective poles on the core portion and spaced therefrom to present air gaps therebetween, said air gaps being arranged in parallel, stylus levers mounted on the case and associated with the respective pole pairs, each lever having a stylus near the free end thereof, and each lever having a separate and distinct armature rigid therewith each of said armatures extending in the magnetic field of the corresponding air gap.

18. The combination recited in claim 17, in which the pick-up has a mount at the end thereof opposed to that of said styli and rotatable about the longitudinal axis of the pick-up for turning the entire pick-up in order to permit of setting thereof for placing into operation that stylus selected for service.

19. A multiple magnetic pick-up for playing any of a plurality of types of phonograph records, said pick-up including a magnetic field structure consisting of an outer portion and a core portion, a voice coil about the latter, each of said magnetic field portions having a plurality of corresponding poles, each pole of each portion being opposed to a corresponding pole of the other portion and spaced therefrom to present an intervening air gap, a plurality of diverse styli each mounted in fixed relation to said structure, such stylus being of type adapted for the respective types of records, the mount of each stylus being of type to afford the freedom of movement appropriate to such stylus, each stylus having a separate and distinct armature rigid therewith, each armature being disposed in the magnetic field of the corresponding air gap.

MAXIMILIAN WEIL.

REFERENCES CITED

The following references are of record in the file of this patent:

UNITED STATES PATENTS

| Number | Name | Date |
|---|---|---|
| 1,570,297 | Dyer | Jan. 19, 1926 |
| 1,704,511 | Nakken | Mar. 5, 1929 |
| 1,778,401 | Pratt | Oct. 14, 1930 |
| 1,958,386 | Thomas | May 8, 1934 |
| 1,992,893 | Thomas | Feb. 26, 1935 |
| 2,197,967 | Dally | Apr. 23, 1940 |
| 2,318,308 | Harris | May 4, 1943 |
| 2,388,116 | Bruderlin | Oct. 30, 1945 |
| 2,452,304 | Hutter | Oct. 26, 1948 |

OTHER REFERENCES

The Recording and Reproduction of Sound, Radio News, Nov. 1947, page 50.